(12) United States Patent
Han et al.

(10) Patent No.: US 11,249,609 B2
(45) Date of Patent: Feb. 15, 2022

(54) TOUCH DISPLAY MODULE, DISPLAY DEVICE AND DRIVING METHOD THEREOF

(71) Applicants: BEIJING BOE OPTOELECTRONICS TECHNOLOGY CO., LTD., Beijing (CN); BOE TECHNOLOGY GROUP CO., LTD., Beijing (CN)

(72) Inventors: Wenchao Han, Beijing (CN); Guangquan Wang, Beijing (CN); Wei Sun, Beijing (CN); Lingyun Shi, Beijing (CN); Yang Chen, Beijing (CN); Bo Gao, Beijing (CN); Tiankuo Shi, Beijing (CN); Dong Chen, Beijing (CN)

(73) Assignees: BEIJING BOE OPTOELECTRONICS TECHNOLOGY CO., LTD., Beijing (CN); BOE TECHNOLOGY GROUP CO., LTD., Beijing (CN)

(*) Notice: Subject to any disclaimer, the term of this patent is extended or adjusted under 35 U.S.C. 154(b) by 16 days.

(21) Appl. No.: 16/081,821

(22) PCT Filed: Dec. 6, 2017

(86) PCT No.: PCT/CN2017/114831
§ 371 (c)(1),
(2) Date: Aug. 31, 2018

(87) PCT Pub. No.: WO2018/205582
PCT Pub. Date: Nov. 15, 2018

(65) Prior Publication Data
US 2021/0103359 A1   Apr. 8, 2021

(30) Foreign Application Priority Data

May 9, 2017   (CN) .......................... 201710323676.8

(51) Int. Cl.
*G06F 3/044* (2006.01)
*G06F 3/041* (2006.01)

(52) U.S. Cl.
CPC .......... *G06F 3/0447* (2019.05); *G06F 3/0445* (2019.05); *G06F 3/0446* (2019.05); *G06F 3/04164* (2019.05)

(58) Field of Classification Search
None
See application file for complete search history.

(56) References Cited

U.S. PATENT DOCUMENTS 9,122,349 B1 * 9/2015 Chang .................... G09G 5/003
10,705,660 B2 * 7/2020 Xiao ...................... G06F 3/0412
(Continued)

FOREIGN PATENT DOCUMENTS

CN    104731423 A    6/2015
CN    105068695 A    11/2015
(Continued)

OTHER PUBLICATIONS

International Search Report and Written Opinion issued in International Patent Application No. PCT/CN2017/114831, dated Mar. 8, 2018; with English translation.
(Continued)

*Primary Examiner* — Matthew Yeung
(74) *Attorney, Agent, or Firm* — McDermott Will & Emery LLP (57) ABSTRACT

A touch display module, includes a touch display panel which includes an array substrate and an alignment substrate arranged opposite each other; and a transparent electrode layer which includes a plurality of pressure detecting electrodes and is disposed on the alignment substrate at a side away from the array substrate.

17 Claims, 3 Drawing Sheets

(56) References Cited

U.S. PATENT DOCUMENTS

| | | | |
|---|---|---|---|
| 10,817,100 B2* | 10/2020 | Noguchi | G06F 3/0414 |
| 2010/0253651 A1* | 10/2010 | Day | G06F 3/0443 |
| | | | 345/175 |
| 2010/0256351 A1* | 10/2010 | Chen | C12N 15/1003 |
| | | | 536/25.4 |
| 2013/0285970 A1* | 10/2013 | Ahn | G06F 3/0445 |
| | | | 345/173 |
| 2014/0354596 A1* | 12/2014 | Djordjev | G06F 3/0421 |
| | | | 345/175 |
| 2015/0062068 A1 | 3/2015 | Shih et al. | |
| 2015/0317951 A1* | 11/2015 | Genoe | G09G 3/3283 |
| | | | 345/212 |
| 2015/0363019 A1* | 12/2015 | Schediwy | G06F 3/0445 |
| | | | 345/174 |
| 2016/0014529 A1* | 1/2016 | Hecht | H04R 19/02 |
| | | | 381/388 |
| 2016/0274724 A1* | 9/2016 | Chang | G06F 3/0445 |
| 2016/0334917 A1* | 11/2016 | Shepelev | G06F 3/0445 |
| 2016/0373864 A1* | 12/2016 | Hecht | H04M 1/0266 |
| 2017/0144408 A1* | 5/2017 | Sata | G06F 3/0446 |
| 2017/0192579 A1* | 7/2017 | Kim | G06F 3/0443 |
| 2017/0220184 A1 | 8/2017 | Liu et al. | |
| 2017/0235414 A1 | 8/2017 | Ding et al. | |
| 2017/0285832 A1* | 10/2017 | Lee | G06F 3/0446 |
| 2018/0088728 A1* | 3/2018 | Wurzel | G06F 3/04166 |
| 2018/0210596 A1 | 7/2018 | Ding et al. | |
| 2018/0356663 A1* | 12/2018 | Zhang | G06F 3/0412 |
| 2019/0355919 A1* | 11/2019 | Lu | B32B 25/20 |
| 2019/0369799 A1* | 12/2019 | Jeon | G06F 21/32 |
| 2021/0312846 A1* | 10/2021 | Atkinson | G09G 3/19 |

FOREIGN PATENT DOCUMENTS

| | | |
|---|---|---|
| CN | 204965399 U | 1/2016 |
| CN | 105404432 A | 3/2016 |
| CN | 205068343 U | 3/2016 |
| CN | 105786243 A | 7/2016 |
| CN | 107153483 A | 9/2017 |

OTHER PUBLICATIONS

Notification of the First Office Action issued in Chinese Patent Application No. 201710323676.8, dated Oct. 8, 2018; with English translation.

* cited by examiner

During the stage of touching, touch driving signals are inputted to the touch structure, and feedback signals outputted by the touch structure are received, to recognize a touch position — S10

During the stage of pressure detection, pressure detecting driving signals are inputted to the plurality of pressure detecting electrodes, and feedback signals are received, to detect the value of pressure — S20

TOUCH DISPLAY MODULE, DISPLAY DEVICE AND DRIVING METHOD THEREOF

CROSS-REFERENCE TO RELATED APPLICATION

This application is a national phase entry under 35 USC 371 of International Patent Application No. PCT/CN2017/114831 filed on Dec. 6, 2017, which claims priority to Chinese Patent Application No. 201710323676.8 filed on May 9, 2017, titled "TOUCH DISPLAY MODULE, DISPLAY DEVICE AND DRIVING METHOD THEREOF", which are incorporated herein by reference in their entirety.

TECHNICAL FIELD

The present disclosure relates to the field of touch display technology, more particularly, to a touch display module, a display device and a driving method thereof.

BACKGROUND

For touch display technology which is capable of detecting pressures, first, it is to detect a touch position on a touch display device, and a touch pressure. Afterwards, a terminal with the above touch display device responds according to different touch positions and touch pressures. Pressure sensing technology is the technology which is capable of detecting an external force applied onto the touch display device (a touch screen). By relating different forces detected to corresponding functions, better experience in human-computer interaction can be obtained.

SUMMARY

Embodiments of the present disclosure adopt the following technical solutions: In a first aspect, a touch display module is provided. The touch display module comprises: a touch display panel which comprises an array substrate and an alignment substrate arranged opposite each other; and a transparent electrode layer which comprises a plurality of pressure detecting electrodes and is disposed on the alignment substrate at a side away from the array substrate.

Optionally, the array substrate comprises a first wiring area which is located in a peripheral area on the array substrate at a side close to the alignment substrate. The alignment substrate comprises a second wiring area which is located in a peripheral area on the alignment substrate at the side away from the array substrate. The second wiring area comprises a plurality of pressure detecting electrode wires which are configured to connect to the plurality of pressure detecting electrodes.

Optionally, the touch display module further comprises a touch structure disposed in the touch display panel. The touch structure is disposed on the array substrate at a side facing the alignment substrate.

Optionally, the touch display module further comprises a touch structure disposed in the touch display panel. The touch structure is disposed on the array substrate at a side away from the alignment substrate.

Optionally, the touch structure comprises touch electrodes. The touch electrodes further serve as common electrodes by time-sharing.

Optionally, the touch structure comprises a touch driving electrode and a touch sensing electrode which are crosswise arranged.

Optionally, the touch display panel further comprises a first polarizer disposed at a side of the array substrate away from the alignment substrate, and a second polarizer disposed at a side of the alignment substrate away from the array substrate.

In a second aspect, a display device, comprising the touch display module according to the first aspect, is provided.

Optionally, the touch display panel comprises a liquid crystal display panel. The display device further comprises a backlight module. The backlight module and the transparent electrode layer of the touch display module are arranged opposite each other and are spaced from each other.

Optionally, the backlight module comprises a metal backplane.

Optionally, the touch display panel comprises an organic light-emitting diode display panel. The display device further comprises a conductive backplane. The conductive backplane and the transparent electrode layer of the touch display module are arranged opposite each other and are spaced from each other.

Optionally, the conductive backplane is made of transparent conductive material or metal material.

Optionally, the array substrate comprises a first wiring area. The alignment substrate comprises a second wiring area. The display device further comprises an integrated circuit chip. Pins of the integrated circuit chip are connected to the first wiring area and the second wiring area.

In a third aspect, a driving method of a display device which comprises the touch display module according to the first aspect, is provided. The driving method comprises: during a stage of touching, inputting pressure detecting driving signals to the plurality of pressure detecting electrodes and receiving feedback signals.

Optionally, a driving method of a display device which comprises the touch display module according to the third or the fourth implementation of the first aspect, is provided. The driving method comprises: during a stage touching, inputting touch driving signals to the touch structure and receiving feedback signals outputted by the touch structure, to recognize a touch position; and inputting pressure detecting driving signals to the plurality of pressure detecting electrodes and receiving feedback signals, to detect a value of pressure.

Optionally, in cases that a touch electrode further serves as a common electrode by time-sharing, the method further comprises: during a stage of displaying, inputting a common voltage signal to the touch electrode.

BRIEF DESCRIPTION OF THE DRAWINGS

In order to describe technical solutions in embodiments of the present disclosure or in the prior art more clearly, the accompanying drawings to be used in the description of embodiments or the prior art will be introduced briefly. Obviously, the accompanying drawings to be described below are merely some embodiments of the present disclosure, and a person of ordinary skill in the art can obtain other drawings according to those drawings without paying any creative effort.

DETAILED DESCRIPTION

The technical solutions in embodiments of the present disclosure will be described clearly and completely with reference to the accompanying drawings in embodiments of the present disclosure. Obviously, the described embodiments are merely a part but not all of the embodiments of the present disclosure. All other embodiments made on the basis of the embodiments of the present disclosure by a person of ordinary skill in the art without paying any creative effort shall be included in the protection scope of the present disclosure.

For touch display technology which is capable of detecting pressure, first, it is to detect a touch position on a touch display device, and a touch pressure. Then, a terminal with the touch display device responds according to different touch positions and touch pressures.

There are technologies capable of sensing and detecting touch pressure in the related art. However, because a touch display panel includes an array substrate and an alignment substrate, for realizing the display function, the touch function, and the pressure detecting function, it needs to bond flexible printed circuits to the array substrate and the alignment substrate correspondingly, and it even usually needs to bond flexible printed circuits to the array substrate at both sides, leading to great complexity on bonding.

Figure 7:
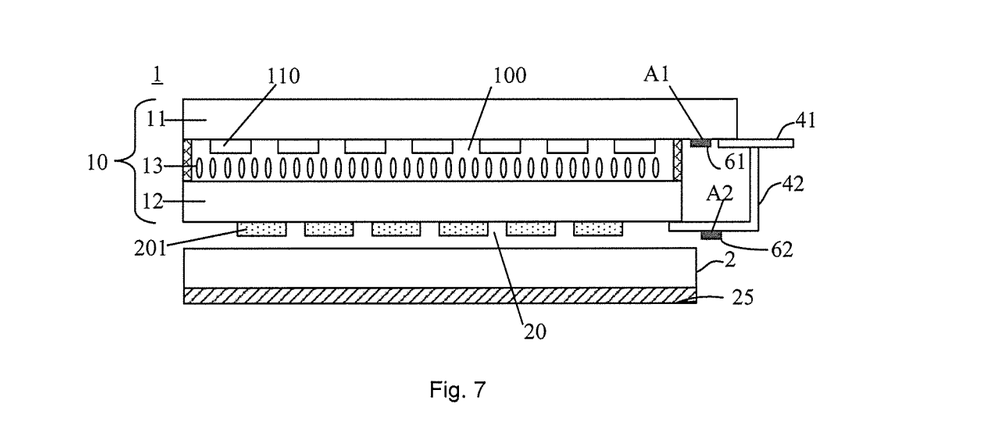
FIG. 7 is a diagram of a display device provided by an embodiment of the disclosure.

Taking a liquid crystal display device shown in FIG. 7 for instance, the liquid crystal display device comprises a touch display module 1 and a backlight module 2. The touch display module comprises: a touch display panel 10 which comprises an array substrate 11 and an alignment substrate 12 arranged opposite each other; and a transparent electrode layer 20 which comprises a plurality of pressure detecting electrodes 201 and is disposed on the alignment substrate 12 at a side facing away from the array substrate 11. Light emitted by the backlight module 2 passes through the alignment substrate 12 and the array substrate 11, and streams from the array substrate 11 at a side facing away from the alignment substrate 12. A finger is to touch the device at a side of the array substrate 11 facing away from the alignment substrate 12. The touch display panel 10 is provided with a touch structure 100 which is disposed on the array substrate 11 at a side facing the alignment substrate 12.

How to detect a touch position on a touch display device is firstly to be introduced.

The touch display panel is able to detect a touch position by self-capacitance mode or mutual capacitance mode.

Specifically, in cases that the touch function is implemented based on the self-capacitance mode, as shown in FIG. 7, the touch structure 100 comprises a plurality of touch electrodes 110. The principle is that: when a finger touches the touch display panel 10 at a light emitting side (the side of the array substrate 11 facing away from the alignment substrate 12), due to effect of the electric field of the human body, the finger, as a conductor, and some touch electrodes 110 form external capacitance. The external capacitance and self-inductance capacitance of the some touch electrodes 110 form a coupling electric field between the some touch electrodes 110 and the finger. Such that, the value of the self-inductance capacitance is to change. The plurality of touch electrodes 110 correspond to and are capable of being electrically connected to a plurality of touch electrode wires one-to-one. The plurality of touch electrode wires respectively extend to a first wiring area A1 disposed on the array substrate 11. The first wiring area A1 is connected with pins of an integrated circuit chip, that is, the plurality of touch electrode wires are respectively connected with the pins of the integrated circuit chip at the first wiring area A1. Optionally, the integrated circuit chip is a first integrated circuit chip 61 as shown in FIG. 7. The first wiring A1 is located in a peripheral area on the array substrate 11 at a side close to the alignment substrate 12. The first integrated circuit chip 61 provides a touch driving signal to the touch structure 100, and receives a change in self-inductance capacitance of each of some touch electrode wires, thereby determining a touch position.

Figure 3:
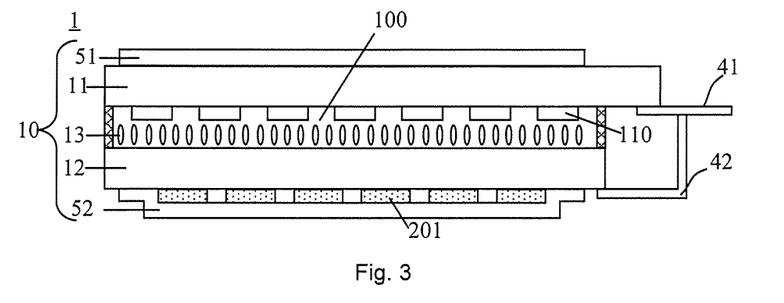
FIG. 3 is a structure diagram of a touch display module provided by embodiments of the disclosure.
Figure 5:
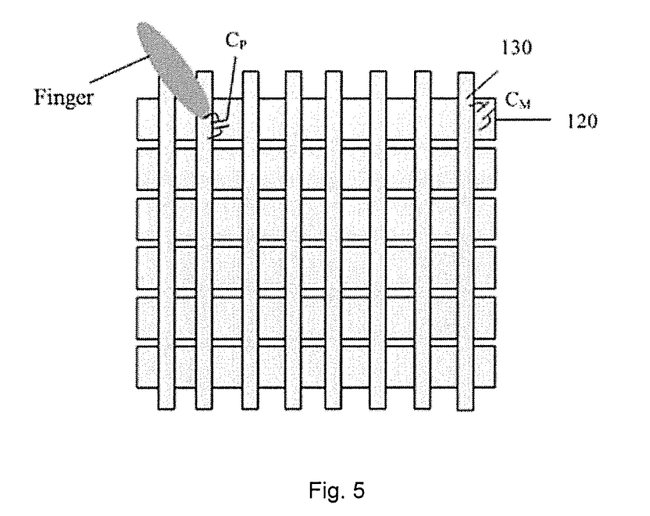
FIG. 5 is a structure diagram of a touch structure provided by embodiments of the disclosure.

In cases that the touch function is implemented based on mutual capacitance, as shown in FIG. 5, the touch structure 100 comprises a plurality of touch driving electrodes 120 and a plurality of touch sensing electrodes 130 which are crosswise arranged. The principle is that: the first integrated circuit chip 61 applies a driving signal to a plurality of touch driving electrode wires and a plurality of touch sensing electrode wires which are connected to the pins of the first integrated circuit chip 61, via the pins of the first integrated circuit chip 61 which are connected to the first wiring area A1 of the array substrate 11. The plurality of touch driving electrode wires and the plurality of touch sensing electrode wires are respectively connected to the plurality of touch driving electrodes 120 and the plurality of touch sensing electrodes 130. Based on the mutual capacitance (denoted by $C_M$) between one of the plurality of touch driving electrodes 120 and a corresponding touch sensing electrode 130, touch sensing electrodes 130 receive touch sensing signals. When the touch display panel 10 has not been contacted by a finger, the plurality of touch sensing electrodes 130 receive a same touch sensing signal. Upon a finger contacting the touch display panel 10, capacitance (denoted by $C_P$) is formed among the finger, at least one of the plurality of touch driving electrodes 120 which is corresponding and at least one of the plurality of touch sensing electrodes 130 which is corresponding. At this time, the capacitance value of touch point position is $C_P+C_M$. A touch sensing signal representing the touch position changes, wherein the signal is received by the at least one of the plurality of touch sensing electrodes 130 which is corresponding to the touch point position. The plurality of touch sensing electrodes 130 send received touch sensing signals to the first integrated circuit chip 61 via the plurality of touch sensing electrode wires and via the pins of the first integrated circuit chip 61 connected to the first wiring area A1 of the array substrate 11, respectively. Thus, the first integrated circuit chip 61 recognizes the touch position. As shown in FIG. 3, touch display panel 10 further comprises a first polarizer 51 disposed at a side of the array substrate 11 facing away from the alignment substrate 12, and a second polarizer 52 disposed at a side of the alignment substrate 12 facing away from the array substrate 11. The transparent electrode layer 20 disposed on a surface of the alignment substrate 12 close to the second polarizer 52.

Figure 8:
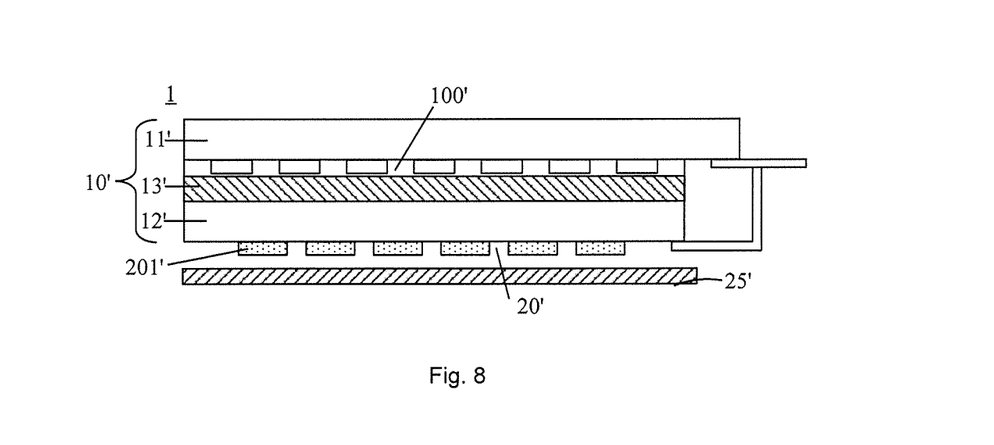
FIG. 8 is a diagram of a display device provided by another embodiment of the disclosure.

How an organic light-emitting diode display device to detect a touch position on the touch display device is to be introduced with an example of organic light-emitting diode display device as shown in FIG. 8. The liquid crystal display device as shown in FIG. 7 comprises the touch liquid crystal display module 1 and the backlight module 2 which comprises a metal backplane 25. The metal backplane 25 of backlight module 2 and the transparent electrode layer 20 of the touch display module 1 are arranged opposite each other and are spaced from each other, wherein air or transparent colloid is comprised therebetween. And, the organic light-emitting diode display device as shown in FIG. 8 is self-luminous based on light-emitting substance in an organic layer, rather than needing to be provided with a backlight module and a liquid crystal layer 13. So that, there is no backlight module in the organic light-emitting diode display device. In embodiments of the present application, an external conductive backplane 25' outside an organic light-emitting diode panel and a transparent electrode layer 20' of a touch display module are arranged opposite each other and are spaced from each other wherein air or transparent colloid is comprised therebetween. The external conductive backplane 25' is able to be made of metal material or transparent conductive material according to the light emitting direction of the organic light-emitting diode panel.

The foregoing touch display module 1' comprises a touch display panel 10'. The touch display panel 10' comprises an array substrate 11' and an alignment substrate 12' which are arranged opposite each other, and an organic layer 13' disposed between the array substrate 11' and the alignment substrate 12'. It is understandable that the alignment substrate 12' is configured to seal organic electroluminescent material therein. The touch display module 1' further comprises the transparent electrode layer 20' which comprises a plurality of pressure detecting electrodes 201'. The transparent electrode layer 20' is disposed on the alignment substrate 12' at a side facing away from the array substrate 11'. The touch display panel 10' comprises a touch structure 100'. The way how the organic light-emitting diode display device detects touch positions on the touch display device is similar to the way how the liquid crystal device detects touch positions on the touch display device, which will not be reiterated. Its main differences from the liquid crystal display device lie in: firstly, the organic light-emitting diode display device is self-luminous based on the light-emitting substance in the organic layer, rather than needing to be provide with a backlight module and a liquid crystal layer 13; and secondly, the organic light-emitting diode display module does not need to be provided with a first polarizer and a second polarizer.

After introducing how to detect touch positions on a touch display device by examples of the liquid crystal display device and the organic light-emitting diode display device, next, how the liquid crystal display device and the organic light-emitting diode display device detect touch pressures is to be introduced.

Figure 1:
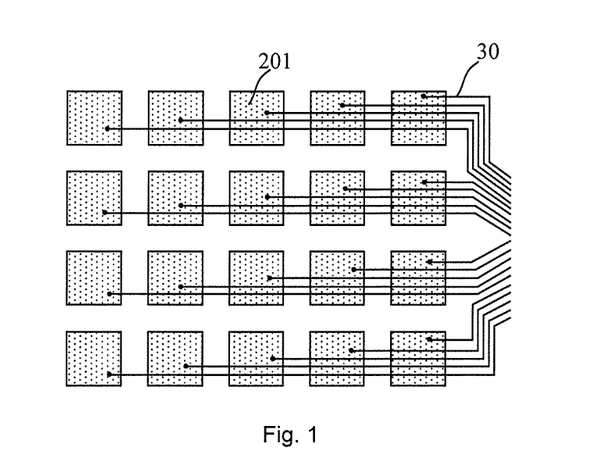
FIG. 1 is a diagram of a transparent electrode layer provided by embodiments of the disclosure.

The liquid crystal display device as shown in FIG. 7 is firstly taken for instance. For realizing a pressure detecting function on the liquid crystal display device having a touch function, as shown in FIG. 7, the alignment substrate 12 comprises a second wiring area A2 which is disposed in a peripheral area on the alignment substrate 12 at a side facing away from the array substrate 11. A plurality of pressure detecting electrode wires 30 as shown in FIG. 1 respectively extend to the second wiring area A2 for connecting to the plurality of pressure detecting electrodes 201. The second wiring area A2 is connected with pins of an integrated circuit chip, that is, the plurality of pressure detecting electrode wires 30 are respectively connected to the pins of the integrated circuit chip at the second wiring area A2. As shown in FIG. 1, the plurality of pressure detecting electrodes 201 are able to be arranged into an array. The liquid crystal display device as shown in FIG. 7 further comprises the backlight module 2. The backlight module 2 and the transparent electrode layer of the touch display module 1 are arranged opposite each other and are spaced from each other.

The foregoing integrated circuit chip is able to comprise a second integrated circuit chip 62 as show in FIG. 7. The second integrated circuit chip 62, by the pins thereof connected to the second wiring area A2, provides pressure detecting driving signals to the plurality of pressure detecting electrodes 201 respectively through the plurality of pressure detecting electrode wires 30.

Because the metal backplane 25 and the transparent electrode layer 20 which includes the plurality of pressure detecting electrodes 201 are arranged opposite each other and are spaced from each other, according to the plane-parallel capacitance formula, i.e.

$$C \propto \varepsilon \frac{S}{D},$$

it can be known that, capacitance (C) is generated between any one of the plurality of pressure detecting electrodes 201 and the metal backplane 25. On this basis, in cases that the array substrate 11 is not under pressure at the side away from the alignment substrate 12, capacitance generated between each of the plurality of pressure detecting electrodes 201 and the metal backplane is constant. In cases that the touch display module 1 is under pressure, due to the deformation of the touch display module 1, a distance between at least one of the plurality of pressure detecting electrodes 201 and the metal backplane changes, leading to a change in capacitance generated between the at least one of the plurality of pressure detecting electrodes 201 and the metal backplane. The plurality of pressure detecting electrodes 201 respectively transmit corresponding results of capacitance detection to the second integrated circuit chip 62 via the plurality of pressure detecting electrode wires 30 and via the pins of the second integrated circuit chip 62 connected to the second wiring area A2. The second integrated circuit chip 62 gets a value of touch pressure according to the obtained results of capacitance detection.

It should be noted that, since the transparent electrode layer 20 is disposed on the alignment substrate 12 at the side away from the array substrate 11, the transparent electrode layer is not able to share an FPC (Flexible Printed Circuit) with the array substrate 11. Therefore, it needs to separately bond an FPC to the alignment substrate 12 at the side away from the array substrate 11.

That is, as shown in FIG. 7, a first FPC 41 is bonded to the array substrate 11 at the side facing the alignment substrate 12, and a second FPC 42 is bonded to the alignment substrate 12 at the side away from the array substrate 11. The first FPC 41 and the second FPC 42 are able to be connected via a connector.

If the array substrate 11 is at the light incident side (at the side where the array substrate 11 is arranged opposite the backlight module) and the plurality of pressure detecting electrodes 201 are disposed on the array substrate 11 at the side facing away from the alignment substrate 12, it needs to bond FPCs to the array substrate 11 at both sides, resulting in an increase of bonding complexity. In embodiments of the present disclosure, this problem can be avoided, because the plurality of pressure detecting electrodes 201 are arranged on the alignment substrate 12 at the side away from the array substrate 11, and therefore it is able to bond the FPCs to the array substrate 11 and the alignment substrate 12 respectively. Moreover, a manufacturing process for the display device is simple, and it does not cause an increase in thickness due to adding the pressure detecting function.

Optionally, the plurality of pressure detecting electrode wires 30 are able to be made of transparent conductive material, or metal conductive material. Considering that the transparent conductive material has larger resistance, and therefore the accuracy of pressure detection may be affected, optionally, the plurality of pressure detecting electrode wires 30 are made of metal conductive material.

Optionally, according to a requirement in the accuracy of pressure detection, the area of each of the plurality of pressure detecting electrodes 201 is able to be appropriately adjusted. That is, the smaller the area is, the higher the accuracy is, and the larger the area is, the lower the accuracy is.

Optionally, in cases that the area of each of the plurality of pressure detecting electrodes 201 is small and the accuracy of pressure detection is high, such as equivalent to the accuracy of touch detection, the pressure detecting electrodes are further able to serve as touch electrodes. In such situation, corresponding results of capacitance detection fed back by the pressure detecting electrodes comprises both the value and the position of a change in capacitance, thereby realizing both pressure detection and touch position recognition. At this point, it is not necessary to separately provide a touch structure. Optionally, the transparent electrode layer 20 is able to be formed in the touch display panel 10 at its light incident side via a patterning process. For example, a transparent conductive film is first formed by a plating method of magnetron sputtering and a photoresist is formed thereon; with a mask, the photoresist is exposed and developed; taking the remaining photoresist as a barrier, the transparent conductive film is etched by an etching process, to form the transparent electrode layer 20; and then the photoresist is removed.

The thickness of the transparent electrode layer 20 is able to be about 1000 Å, such as about 850-1200 Å. Specifically, it is able to be 850 Å, 870 Å, 900 Å, 920 Å, 950 Å, 970 Å, 1000 Å, 1050 Å, 1100 Å, 1150 Å, 1200 Å and so on.

Optionally, the material of the transparent electrode layer 20 is able to be ITO (Indium Tin Oxide), IZO (Indium Zinc Oxide) or other transparent conductive materials. The first integrated circuit chip 61 and the second integrated circuit chip 62 are able to be the same integrated circuit chip or different ones. Using one integrated circuit chip to control the touch display module 1 for display and touch detection can reduce the number of integrated circuit chips. The advantage of using different integrated circuit chips is that the signal to noise ratio can be improved by separating the touch from the pressure detection.

Figure 6:
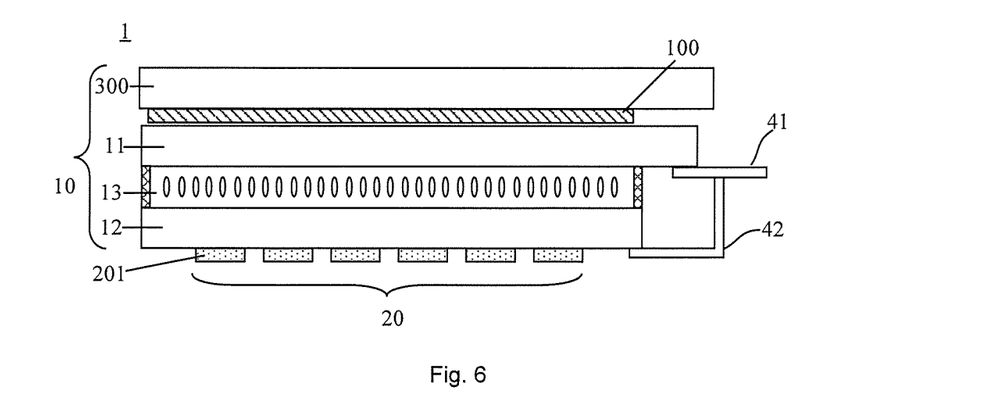
FIG. 6 is a structure diagram of another touch display module provided by embodiments of the disclosure.

In the touch display module 1 provided by an embodiment of the present disclosure, optionally, as shown in FIG. 6, the touch structure 100 is able to be disposed on the array substrate 11 at the side facing away from the alignment substrate 12.

Further, as shown in FIG. 6, the touch display panel 10 further comprises a cover plate 300 located at a side of the array substrate 11.

As shown in FIG. 7, backlight module 2 further comprises a light guide plate, a light source, an optical membrane or the like which are arranged on the metal backplane.

The touch structure 100 is able to be disposed on the array substrate 11 or the alignment substrate 12. However, by disposing the touch electrodes 110 on the array substrate 11 at the side facing away from the alignment substrate 12, display and touch can be separately driven, which has lower technical difficulty to be realized.

In cases that the touch display panel 10 realizes the touch function based on the self-capacitance mode, the touch electrodes 110 included in the touch structure 100 are disposed on the array substrate 11, and the touch electrodes 110 further serve as the common electrodes by time-sharing.

That is, during the stage of displaying, the touch electrodes 110 are provided with a common voltage, to serve as common electrodes; and during the stage of touching, the touch electrodes 110 are provided with touch driving signals.

Figure 2:
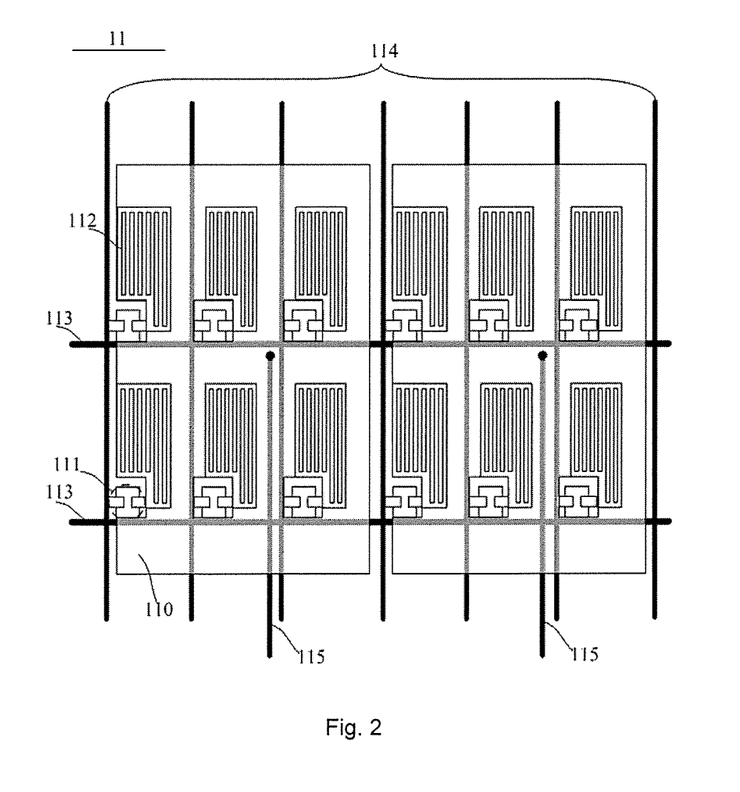
FIG. 2 is a top view of an array substrate provided by embodiments of the disclosure.

As shown in FIG. 2, the array substrate 11 further comprises thereon a thin film transistor 111, a pixel electrode 112, a gate line 113 and a data line 114. The thin film transistor 111 comprises a gate electrode, a gate insulating layer, an active layer, a source electrode and a drain electrode. The drain electrode and the pixel electrode 112 are electrically connected. The source electrode and the data line 114 are electrically connected. The gate electrode and the gate line 113 are electrically connected. The plurality of touch electrodes 110 are corresponding to and electrically connected to the plurality of touch electrode wires 115 one-to-one. The plurality of touch electrode wires 115 are able to be disposed in the same layer as the gate electrode, or disposed in the same layer as the source electrode and the drain electrode.

In an aspect, the touch electrodes 110 further serving as the common electrodes can make the touch display panel 10 have a higher integration level and a lower thickness without leading to an increase in pattering process. In another aspect, TDDI (Touch and Display Driver Integration) technology can be used to realize the display and touch, so as to reduce the number of integrated circuit chips, simplify the technological process, and improve the yield. In yet another aspect, in cases that the touch electrodes 110 serve as the common electrodes, it is able to drive liquid crystal to deflect based on ADS (AdvancedSuper Dimensional Switching) technology, which make the touch display panel have advantages of high resolution, high transmissivity, low power consumption, wide viewing angle, high aperture ratio, low color difference, no push mura and so on.

Next, how the organic light-emitting diode display device to detect the touch pressure is to be introduced with reference to FIG. 8. Since the organic light-emitting diode display device is self-luminous based on the light-emitting substance in the organic layer, the display device does not comprise a backlight module and a liquid crystal layer 13. In order to detect a touch pressure, the organic light-emitting diode display device further comprises a conductive backplane 25'. The conductive backplane 25' and the transparent electrode layer 20' of the touch display module are arranged opposite each other and are spaced from each other, wherein air or transparent colloid is comprised therebetween. The conductive backplane 25' is able to be made of metal material or transparent conductive material according to the light emitting direction of the organic light-emitting diode panel. On the basis of disposing the conductive backplane 25', when the touch display module 1 is under pressure, the distance between at least one of the plurality of pressure detecting electrodes 201 and the conductive backplane 25' changes, due to the deformation of touch display module 1. Thus, capacitance generated between the at least one of the plurality of pressure detecting electrodes 201 and the conductive backplane 25' changes. The value of the touch pressure is able to be obtained based on the change generated in capacitance. The organic light-emitting diode display device as shown in FIG. 8 has a process of detecting a touch pressure similar to the liquid crystal display device as shown in FIG. 7 in other respects.

Embodiments of the present disclosure further provide a driving method of the display device as above described. The method comprises: during a stage of touching, pressure detecting driving signals are inputted to the plurality of pressure detecting electrodes, and feedback signals are received.

Figure 4:
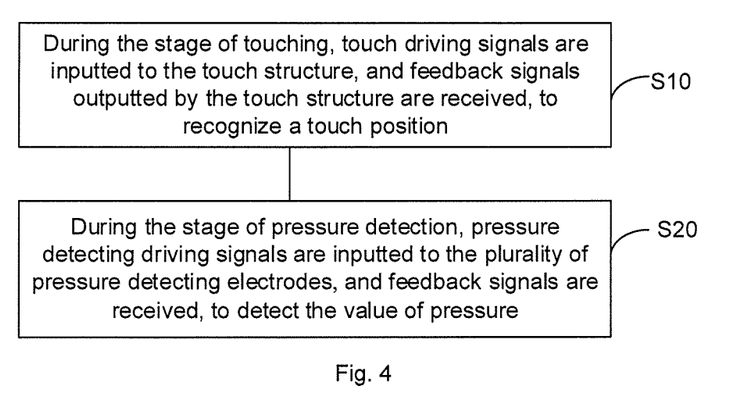
FIG. 4 is a flow chart of a driving method provided by embodiments of the disclosure.

Referring to corresponding description of the foregoing device, in cases that the pressure detecting electrodes further serve as touch electrodes, both pressure detection and touch position recognition are realized thereby. In cases that the pressure detecting electrodes and the touch structure are respectively provided, as shown in FIG. 4, the method comprises:

S10. During the stage of touching, touch driving signals are inputted to the touch structure 100, and feedback signals outputted by the touch structure 100 are received, to recognize a touch position.

About detailed implementation of this step, corresponding description of the foregoing device is referenced.

S20. During the stage of pressure detection, pressure detecting driving signals are inputted to the plurality of pressure detecting electrodes 201, and feedback signals are received, to detect the value of pressure. About detailed implementation of this step, corresponding description of the foregoing device is referenced.

After being detected, the value of the pressure is able to be compared with standard pressure ranges which are pre-stored. If the value of the pressure is within one of the standard pressure ranges, the function of the display device corresponding to this range is turned on.

A standard pressure range is able to correspond to a function of the display device. Therefore, multiple standard pressure ranges are able to be set according to specific function items. Such correspondence is able to be preset in advance.

Here, the functions of the display device corresponding to the standard pressure ranges are not limited, and the corresponding functions are able to be set according to requirements of the display device. The value of pressure is compared with the standard pressure ranges which are pre-stored. If the value of the pressure is within one of the standard pressure ranges, a function corresponding to this pressure range is to be realized, such as zooming in on the information at a touch position, returning to a main page, locking a screen and the like.

It should be noted that, as known by a person of skill in the art, functions such as touch and pressure detection are all based on the display function. Therefore, the driving method comprises a stage of displaying in addition to the stage of touching and the stage of pressure detection. In the stage of displaying, the touch display panel 10 is controlled to display.

Embodiments of the present disclosure provide a driving method of the foregoing display device, which enables the display device to implement touch and pressure detection functions.

In cases that the touch electrodes 110 further serve as the common electrodes by time-sharing, the method further comprises: during the stage of displaying, a common voltage signal is inputted to the touch electrodes 110.

That is, during the stage of displaying, the common voltage is able to be provided to the touch electrodes 110 by the first integrated circuit chip 61, making the touch electrodes 110 serve as common electrodes; and during the stage of touching, the touch driving signals are provided to the touch electrodes 110 by the first integrated circuit chip 61, making the touch electrodes 110 serve as touch recognition.

In an aspect, the touch electrodes 110 further serving as the common electrodes can make the touch display panel 10 have a higher integration level and a lower thickness without leading to an increase in pattering process. In another aspect, TDDI (Touch and Display Driver Integration) technology can be used to realize the display and touch, so as to reduce the number of integrated circuit chips, simplify the technological process, and improve the yield.

The foregoing descriptions merely show specific implementations of the present disclosure, and the protection scope of the present disclosure is not limited thereto. Variations or replacements readily conceived by any person of skill in the art within the technical scope disclosed by the present disclosure, shall fall into the protection scope of the present disclosure. Accordingly, the protection scope of the present disclosure shall be subject to the protection scope of the claims.

What is claimed is:

1. A touch display device, comprising:
   an array substrate and an alignment substrate arranged opposite each other, wherein the array substrate comprises a plurality of thin film transistors;
   a liquid crystal layer disposed between the array substrate and the alignment substrate;
   a transparent electrode layer which comprises a plurality of pressure detecting electrodes and is disposed on the alignment substrate at a side away from the array substrate;
   a backlight module which comprises a conductive backplane and is disposed on the alignment substrate at the side away from the array substrate;
   wherein the conductive backplane and the transparent electrode layer are arranged opposite each other and are spaced from each other by air; and
   the plurality of pressure detecting electrodes are configured to detect a value of pressure and recognize a touch position.

2. The touch display device according to claim 1, wherein, the array substrate comprises a first wiring area which is located in a peripheral area on the array substrate at a side close to the alignment substrate;
   the alignment substrate comprises a second wiring area which is located in a peripheral area on the alignment substrate at the side away from the array substrate; and
   the second wiring area comprises a plurality of pressure detecting electrode wires which are configured to connect to the plurality of pressure detecting electrodes.

3. The touch display device according to claim 1, wherein, the plurality of pressure detecting electrodes further serve as common electrodes by time-sharing.

4. The touch display device according to claim 1, wherein, the touch display device further comprises a first polarizer disposed at a side of the array substrate away from the alignment substrate, and a second polarizer disposed at a side of the alignment substrate away from the array substrate.

5. A display device, comprising:
   an array substrate and an alignment substrate arranged opposite each other, wherein the array substrate comprises a plurality of thin film transistors, and the alignment substrate is configured to seal organic electroluminescent material;
   an organic layer disposed between the array substrate and the alignment substrate;

a transparent electrode layer which comprises a plurality of pressure detecting electrodes and is disposed on the alignment substrate at a side away from the array substrate;

a conductive backplane, wherein the conductive backplane is disposed on the alignment substrate at the side away from the array substrate, and the conductive backplane and the transparent electrode layer are arranged opposite each other and are spaced from each other by air, and the plurality of pressure detecting electrodes are configured to detect a value of pressure and recognize a touch position.

6. The display device according to claim 5, wherein the conductive backplane is made of transparent conductive material or metal material.

7. The display device according to claim 5, wherein, the array substrate comprises a first wiring area, the alignment substrate comprises a second wiring area, the display device further comprises an integrated circuit chip, and pins of the integrated circuit chip are connected to the first wiring area and the second wiring area.

8. A driving method of the display device according to claim 1, comprising:

during a stage of touching, inputting touch driving signals to the plurality of pressure detecting electrodes and receiving feedback signals outputted by the plurality of pressure detecting electrodes, to recognize the touch position; and inputting pressure detecting driving signals to the plurality of pressure detecting electrodes and receiving feedback signals, to detect the value of pressure.

9. The driving method according to claim 8, wherein, in cases that a pressure detecting electrode further serves as a common electrode by time-sharing, the method further comprises:

during a stage of displaying, inputting a common voltage signal to the pressure detecting electrode.

10. The driving method according to claim 8, wherein, the feedback signals comprise both a value and a position of a change in capacitance so that pressure detection and touch position recognition are both realized.

11. The touch display device according to claim 5, wherein, the array substrate comprises a first wiring area which is located in a peripheral area on the array substrate at a side close to the alignment substrate;

the alignment substrate comprises a second wiring area which is located in a peripheral area on the alignment substrate at the side away from the array substrate; and the second wiring area comprises a plurality of pressure detecting electrode wires which are configured to connect to the plurality of pressure detecting electrodes.

12. The touch display device according to claim 5, wherein, the plurality of pressure detecting electrodes further serve as common electrodes by time-sharing.

13. The display device according to claim 1, wherein the conductive backplane is made of transparent conductive material or metal material.

14. The display device according to claim 1, wherein, the array substrate comprises a first wiring area, the alignment substrate comprises a second wiring area, the display device further comprises an integrated circuit chip, and pins of the integrated circuit chip are connected to the first wiring area and the second wiring area.

15. A driving method of the display device according to claim 5, comprising:

during a stage of touching, inputting touch driving signals to the pressure detecting electrode and receiving feedback signals outputted by the pressure detecting electrode, to recognize the touch position; and inputting pressure detecting driving signals to the plurality of pressure detecting electrodes and receiving feedback signals, to detect the value of pressure.

16. The driving method according to claim 15, wherein, in cases that a pressure detecting electrode further serves as a common electrode by time-sharing, the method further comprises:

during a stage of displaying, inputting a common voltage signal to the pressure detecting electrode.

17. The driving method according to claim 15, wherein, the feedback signals comprise both a value and a position of a change in capacitance so that pressure detection and touch position recognition are realized at a same time.

* * * * *